March 5, 1968  A. N. LARRINGTON  3,371,438
WORK SCHEDULING APPARATUS
Filed Aug. 23, 1965

Inventor
Albert N. Larrington
By his Attorney
Richard B. Megley

United States Patent Office 3,371,438
Patented Mar. 5, 1968

3,371,438
WORK SCHEDULING APPARATUS
Albert N. Larrington, 10 Knollwood Road,
Squantum, Mass. 02171
Filed Aug. 23, 1965, Ser. No. 481,477
1 Claim. (Cl. 40—124)

ABSTRACT OF THE DISCLOSURE

Apparatus for scheduling work to be performed at a plurality of work stations comprising a production panel for identifying in process work and an inventory panel for recording the backlog of work comprising a plurality of discrete, endless belts each movably mounted for independent movement in alined relationship and means for mounting a plurality of work order cards on each of said belts.

---

Figure 1:
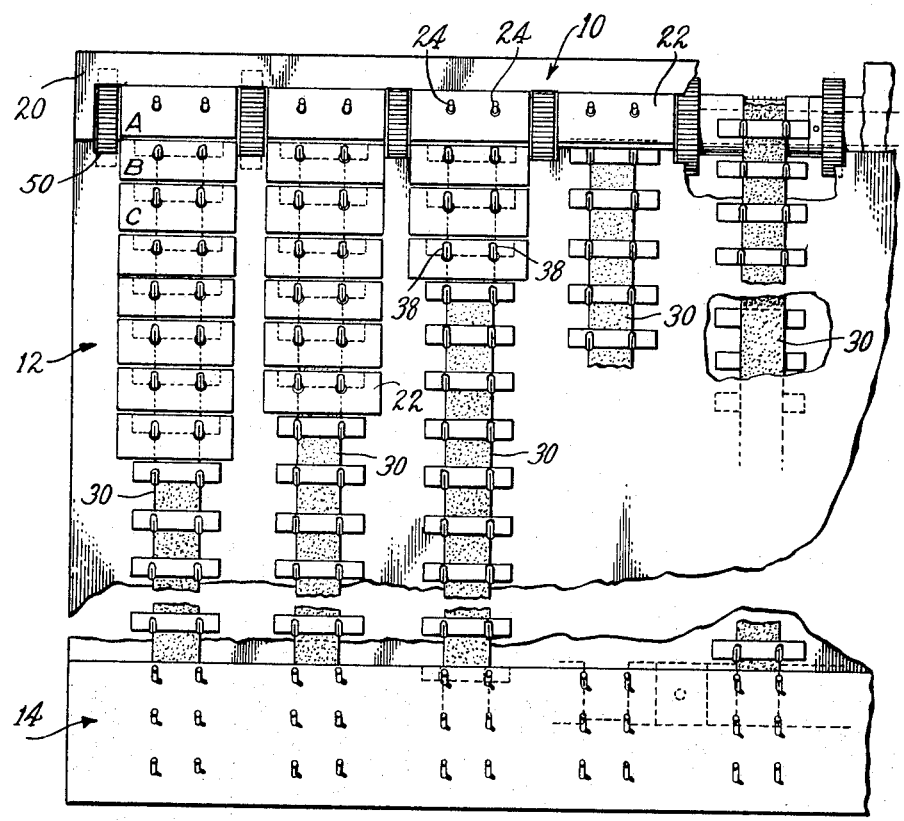

This invention relates to apparatus for scheduling work load and, more particularly, to apparatus for scheduling the work to be performed at a plurality of work stations for identifying in-process work and the distribution of inventory work, and for adjusting the distribution of inventory work to compensate for production delays recorded on the apparatus.

Heretofore, apparatus employed for the scheduling of work backlog or inventory work have not been adapted to permit rapid adjustment to reflect changes in the flow of work to a plurality of machines. That is, previously available devices utilized for this purpose generally outlined a single schedule which indicated the work to be performed by a given number of machines. If one or more of the machines included in the schedule became inoperative, the entire schedule had to be revamped. No apparatus available in the past provided means which ensured the identification of an inoperative machine and permitted instantaneous rescheduling of the inventory work to compensate therefor.

Accordingly, it is an object of the present invention to provide apparatus of controlling and recording the introduction of work to a plurality of machines.

It is a further and more specific object of this invention to provide apparatus for continuously identifying in-process work and recording inventory work in which the inventory work may readily be adjusted to attain uniform distribution of the work load.

It is also a further and more specific object of this invention to provide apparatus which graphically identifies in-process work and backlog distributed between a number of machines.

To this end and in accordance with a feature of this invention there is provided apparatus for scheduling work to be performed at a plurality of work stations comprising a production panel having a plurality of mounting members spacially located thereon for mounting a plurality of work order cards in spaced relationship and an inventory panel comprising a plurality of endless belts each movably mounted for independent movement in alined relation to one of said spaced mounting members and means for mounting a plurality of work order cards in spaced relation on each of said belts.

The above and other features of the invention will now be more particularly described with reference to the accompanying drawings and pointed out in the claim. It will be understood that the particular work control and scheduling apparatus embodying the invention is shown by way of illustration only and not as a limitation of the invention. The principles and features of this invention may be employed in varied and numerous embodiments without departing from the scope of the invention.

Figure 2:
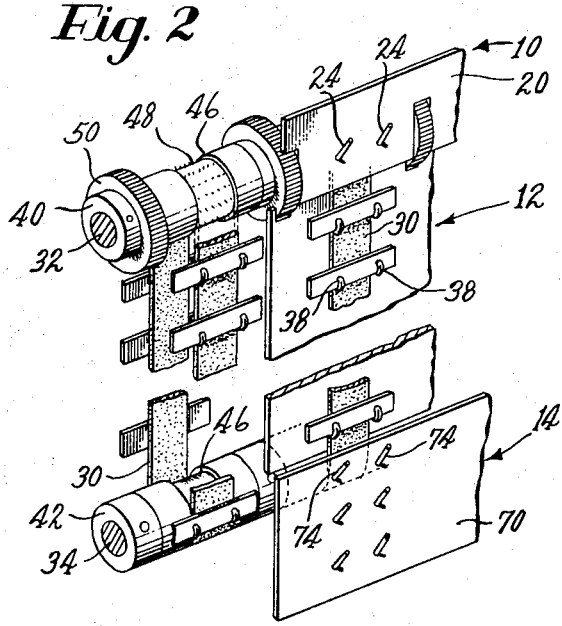

In the drawings,

FIG. 1 is a front view, partly in section of a portion of a scheduling apparatus embodying features of this invention; and FIG. 2 is a perspective view with parts broken away and removed of the scheduling board illustrated in FIG. 1.

In the preferred embodiment of this invention illustrated in FIGS. 1 and 2, a work control and scheduling apparatus is provided comprising an in-process or production panel 10 for identifying work currently being processed on machines or at work stations covered by the apparatus, a dynamic inventory or backing panel 12 which presents a graphic analysis of the work backlog scheduled for the various machines or work stations, and an overload panel 14 for recording work orders which cannot presently be scheduled on the inventory panel.

The production panel 10 comprises an elongated board 20 having a plurality of mounting members spacially secured thereto upon which work order cards 22 may be mounted. As illustrated in the drawings, a pair of angularly projecting studs 24, 24 are employed in the preferred embodiment to mount each work order card 22. Each set of studs 24, 24 represents a work station or machine and each work order card 22 represents the amount of work that can theoretically be performed at the station in a given interval of time. The production panel 10, as well as the inventory board and overload board to be hereinafter described, may be of any convenient size necessary to accommodate the total number of machines or work stations to be scheduled. Accordingly, when all of the work stations are operative, work order cards 22 appear at each position on the production board 20. The work order cards may be appropriately marked to identify the quantity of work and the time the work was initially scheduled whereby the efficiency of each work station may be scrutinized by examination of the work order cards. The work order cards are removed from a given set of studs 24, 24 or station when the work represented thereby is completed and a new work order card advanced to the production panel 10 from the inventory panel 12 as hereinafter described.

The inventory panel 12 comprises a plurality of endless belts 30 movably mounted for independent movement on displaced shafts 32, 34. The belts 30 are positioned in alined relation to the spaced mounting members 24, 24. That is, in the preferred embodiment, a belt 30 is alined with each pair of studs 24, 24. Each of the belts 30 has a plurality of cooperative mounting clips 38, 38 spacially mounted thereon upon which work order cards 22 may be conveniently mounted. Accordingly, a work order card 22 representing a given quantum of work may be entered as inventory work to be performed at a particular work station simply by placing the card 22 on the appropriate, unfilled mounting clips 38, 38.

Each of the endless belts 30 is movably mounted on the shafts 32, 34 by means of discrete sleeves 40, 42 (FIG. 2) concentric with the shafts 32, 34, respectively, and freely rotatable thereon. The belts 30 are received in recessed central portions 46 of the sleeves 40, 42. The recessed portion of each of the sleeves 40 associated with the upper shaft 32 is provided with a plurality of cogs 48 which grip a belt 30 positioned on the sleeve 40 whereby to establish a positive drive linkage to translate rotary movement of the sleeve 40 to the belt 30. Each of the upper sleeves 40 has a knurled, annular disc 50 mounted thereon whereby the relative position of each of the belts 30 readily may be adjusted by rotating the disc 50 associated therewith. It is thus possible quickly to advance the inventory work order cards 22 scheduled for a particular work station, i.e. mounted on the associated belt 30, when a work order on the production panel is completed by placing the next work order card 22 on the belt 30 on the production panel 10 and rotating the associated disc 50 until the succeeding work order card is in position below the production panel 10.

The overload panel 14 comprises an elongated board 70 having a plurality of mounting members spacially secured thereto in alined relation to each of the belts 30 upon which work order cards 22 may be mounted. As illustrated in the drawings, a pair of angularly projecting studs 74, 74 are employed in the preferred embodiment to mount the work order cards 22. The overload panel 14 is utilized only when the entire production panel and inventory panel have been filled with work order cards 22. Work order cards 22 mounted on the overload panel 14 are advanced to the inventory panel 12 when an opening is created by advancement of a work order card 22 to the production panel 10. A number of mounting members are provided at each position to ensure adequate space to absorb any forseeable backlog.

In the use of the apparatus of the preferred embodiment of the present invention illustrated in FIGS. 1 and 2, work order cards 22 representing a given quantum of work are positioned at each station on the production panel 10 at the beginning of the initial work period. The work order cards 22 are appropriately marked to indicate the time they were scheduled and the date the order was received. Work order cards 22 representing the backlog of work which cannot be scheduled for performance during the initial work period are positioned on the inventory panel 12. The work order cards 22 located on the inventory panel 12 are initially distributed evenly between the belts 30 whereby the backlog of work for each work station is equal. Excess work order cards 22 which cannot presently be located on the inventory panel 12 are placed on the overload panel 14. Normally, however, the production panel and inventory panel are preferably of such size as to accommodate all the work order cards 22.

When the work represented by a particular work order card 22 on the production panel 10 is completed; the card is removed, the uppermost card on the alined belt 30 of the inventory panel 12 advanced to the production panel 10 to replace it, and the belt 30 moved to advance the next work order card on the inventory panel 12 to the upper position. For example, when the work represented by card 22A in FIG. 1 is completed, it is removed and replaced by card 22B. The belt 30 is then advanced until the card 22C is in the position formerly occupied by the card 22B. Thus, when a work order is completed, the entire schedule of work for a particular work station is advanced when the belt 30 is moved.

The work order cards 22 are not removed from the production panel 10 until the work represented thereby is completed. Accordingly, if a work stoppage or slow-down occurs at a particular work station, the work order cards will not be advanced. Thus, any failure of a particular work station to perform in accordance with the prescribed standard will be registered on the inventory board. The inventory board thus gives notice that remedial action is required. If the work stoppage was caused by machinery failure, the overall work schedule may easily be revamped by shifting the work order cards scheduled for the defective machine to work stations that are on or ahead of schedule. This may readily be determined by scanning the inventory board.

A cursory study of the inventory panel also provides information as to the efficiency of each work station, the distribution of the work load, and the total backlog of work. Thus, the apparatus of this invention provides work control and scheduling means which easily may be operated and which graphically records and displays the exact status of the work backlog for each work station as well as information relating to the changing total work backlog.

Having thus described my invention, what I claim as new and desire to secure by Letters Patent of the United States is:

1. Apparatus for scheduling work to be performed at a plurality of work stations to facilitate effective use of said work stations comprising a production panel having a plurality of mounting members spacially located thereon for mounting a plurality of work order cards in spaced relationship and an inventory panel comprising a plurality of discrete endless belts each movably mounted for independent movement in alined relation to one of said spaced mounting members, means for mounting each of said endless belts comprising displaced shafts, discrete sleeves mounted on each of said shafts, each of said sleeves having a recessed central portion sized for mounting one of said belts in close fitting relation therein, and means located in said recess to establish a positive drive linkage with a belt located therein, means for mounting a plurality of work order cards in spaced relation on each of said belts, and means for independently imparting controlled translation to each of said belts whereby each of said belts may be moved independently of the other belts to permit continuous control and adjustment of the work backlog at each work station.

References Cited
UNITED STATES PATENTS

| 1,244,282 | 10/1917 | Berthelote | 40—96 |
| 3,225,473 | 12/1965 | Bailey | 40—96 |

FOREIGN PATENTS

| 241,673 | 10/1925 | Great Britain. |

EUGENE R. CAPOZIO, *Primary Examiner.*

W. J. CONTRERAS, *Assistant Examiner.*